US008804935B2

United States Patent
Seligmann et al.

(10) Patent No.: US 8,804,935 B2
(45) Date of Patent: Aug. 12, 2014

(54) CALL ESTABLISHMENT BASED ON PRESENCE

(75) Inventors: Doree Duncan Seligmann, New York, NY (US); Xueshan Shan, Milpitas, CA (US); Reinhard Peter Klemm, Basking Ridge, NJ (US); Ajita John, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1328 days.

(21) Appl. No.: 11/049,916

(22) Filed: Feb. 3, 2005

(65) Prior Publication Data

US 2006/0182251 A1 Aug. 17, 2006

(51) Int. Cl.
*H04M 3/42* (2006.01)

(52) U.S. Cl.
USPC ............ 379/210.01; 379/211.02; 379/212.01; 379/164

(58) Field of Classification Search
USPC ............. 379/210.01, 202.01–206.01, 209.01, 379/211.02, 212.01, 265.11
See application file for complete search history.

(56) References Cited

U.S. PATENT DOCUMENTS

| 5,185,782 | A | * | 2/1993 | Srinivasan | 379/210.01 |
|---|---|---|---|---|---|
| 5,822,418 | A | * | 10/1998 | Yacenda et al. | 379/201.07 |
| 6,154,644 | A | | 11/2000 | Murray | |
| 6,160,881 | A | * | 12/2000 | Beyda et al. | 379/209.01 |
| 6,473,615 | B1 | | 10/2002 | Theppasandra et al. | |
| 6,493,443 | B1 | * | 12/2002 | Furman et al. | 379/210.01 |
| 6,741,554 | B2 | * | 5/2004 | D'Amico et al. | 370/225 |
| 6,804,509 | B1 | * | 10/2004 | Okon et al. | 455/414.1 |
| 2002/0018549 | A1 | * | 2/2002 | Burg | 379/209.01 |
| 2003/0138092 | A1 | | 7/2003 | Maekiniemi et al. | |
| 2003/0215079 | A1 | | 11/2003 | Watanabe | |
| 2004/0196856 | A1 | | 10/2004 | Bondarenko | |
| 2005/0009537 | A1 | | 1/2005 | Crocker et al. | |
| 2005/0013426 | A1 | * | 1/2005 | Ooki | 358/1.15 |

FOREIGN PATENT DOCUMENTS

EP 1465398 10/2004

OTHER PUBLICATIONS

"EP Application No. 06250607.6 Extended Search Report", Oct. 7, 2008, Publisher: EPO, Published in: EP.
Hyam, Kristy, "CA Application No. 2533200 Office Action", Mar. 6, 2009, Publisher: CIPO, Published in: CA.
"EP Application No. 06250607.6-2414 Examination Report Feb. 23, 2007", Publisher: EPO, Published in: EP.
Schorgg, A., "EP Application No. 06250607 Extended Search Report May 17, 2006", Publisher: EPO, Published in: EP.
Hyam, Kristy, "CA Application No. 2,533,200 Office Action Apr. 16, 2010", , Publisher: CIPO, Published in: CA.
Hyam, Kristy, "CA Application No. 2,533,200 Office Action Apr. 1, 2011", , Publisher: CIPO, Published in: CA.

* cited by examiner

Primary Examiner — Duc Nguyen
Assistant Examiner — Yosef K Laekemariam

(57) ABSTRACT

An apparatus and methods are disclosed that enable a caller to specify a condition of availability for a return call when the caller is unable to reach the called user. A condition might indicate a time interval in which the caller is willing to accept a return call, a location, or some other constraints. In the illustrative embodiments, when a caller places a call and is unable to reach the called user, the caller is prompted via an interactive voice response (IVR) system for one or more conditions of availability for a return call. As soon as the called user's terminal becomes available, a software application checks whether the condition of availability is satisfied, and if so, establishes a call between the caller's terminal and the called user's terminal.

15 Claims, 4 Drawing Sheets

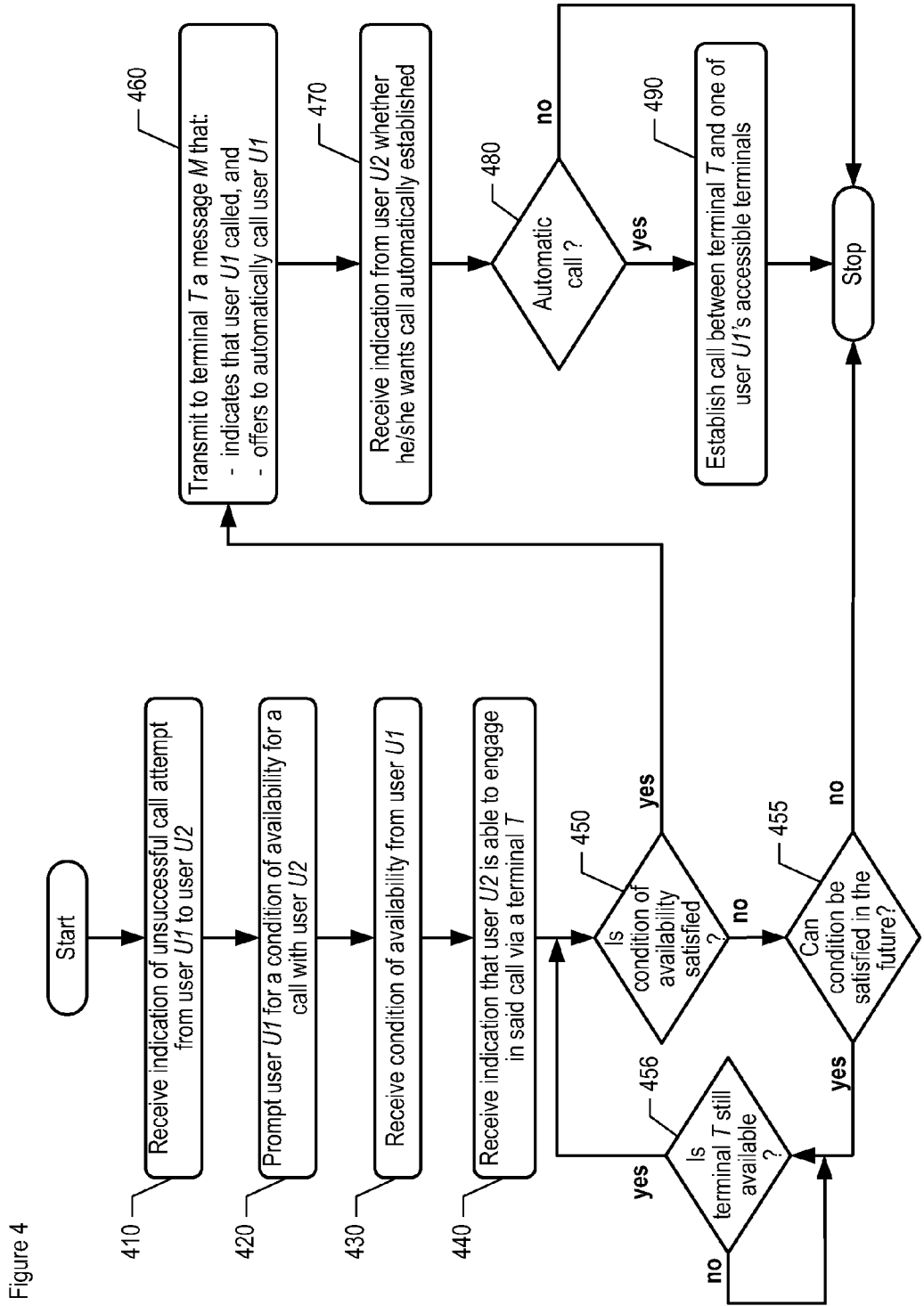

CALL ESTABLISHMENT BASED ON PRESENCE

FIELD OF THE INVENTION

The present invention relates to telecommunications in general, and, more particularly, to a technique for establishing calls between telecommunications terminals based on presence information.

BACKGROUND OF THE INVENTION

When a first telecommunications terminal user $U_1$ calls a second user $U_2$'s terminal and is unable to reach user $U_2$ (e.g., user $U_2$ is currently engaged in another call, user $U_2$'s terminal is powered off, etc.), typically user $U_1$ can leave a message for user $U_2$ (e.g., voice mail, etc.). After the message has been left, typically user $U_2$'s terminal outputs a signal that indicates that there is a message waiting (e.g., a red light, a character string such as "1 New Message", etc.). Alternatively, in some telecommunications systems user $U_1$ can invoke an automatic callback feature that automatically establishes a call between user $U_1$'s terminal and user $U_2$'s terminal as soon as user $U_2$'s terminal becomes available.

SUMMARY OF THE INVENTION

The present invention enables a caller, when he or she is unable to reach a called user, to specify a condition of availability for a return call. For example, the caller might indicate that he or she is willing to accept a return call between 7:00 AM and 10:00 PM, or only when he or she is not at home, or when some combination of constraints is satisfied (e.g., both time and location, etc.). When the called user's telecommunications terminal subsequently becomes available (e.g., the terminal is powered on, etc.), the terminal is called with a message M that (i) indicates that the caller has tried to reach him, and (ii) offers to automatically call the caller.

In the illustrative embodiments of the present invention, when a caller places a call and is unable to reach the called user, the caller is prompted via an interactive voice response (IVR) system for one or more conditions of availability for a return call. In the first illustrative embodiment, as soon as the called user's terminal becomes available, a software application checks whether the condition of availability is presently satisfied. If so, the called user's terminal is called with message M, as described above; otherwise, no such call is established. The second illustrative embodiment is similar to the first illustrative embodiment except that when the condition of availability is not satisfied, the software application determines whether the condition of availability might possibly be satisfied in the future, and if so, continually checks for the condition of availability to become satisfied. For example, at time 4:30 PM the condition of availability "today between 5:00 PM and 6:00 PM when I am in my office" might be satisfied in the future, but at time 6:30 PM this condition will never be satisfied.

The illustrative embodiments of the present invention provide the indicated functionality for a variety of different terminal types (e.g., cell phones, wireline telephones, IEEE [Institute of Electrical and Electronics Engineers] 802.11 wireless local-area network telephones, etc.), and across telecommunications terminals when a user has two or more terminals. For example, suppose a caller calls a user's cell phone while the user is on an airplane and, unable to reach the user, leaves an condition of availability for a return call. Suppose further that when the called user gets off the airplane, she turns on her IEEE 802.11 phone (some airports provide IEEE 802.11 wireless service), but not her cell phone (perhaps the battery in her cell phone is dead). In the illustrative embodiments, a call will be established with the IEEE 802.11 phone (provided the condition of availability is satisfied) even though the user's cell phone was called.

The illustrative embodiment comprises: receiving a first signal that comprises a condition of availability of a first user for a call with a second user; receiving a second signal that indicates that the second user is able to engage in the call via a telecommunications terminal T; and transmitting a third signal to the telecommunications terminal T if, and only if, the second signal is received when the condition of availability is satisfied, wherein the third signal indicates that the first user called.

BRIEF DESCRIPTION OF THE DRAWINGS

FIG. 4 depicts a flowchart of the operation of communications server 104 when an unsuccessful call attempt occurs, in accordance with the second illustrative embodiment of the present invention.

DETAILED DESCRIPTION

The term appearing below is given the following definitions for use in this Description and the appended Claims.

For the purposes of the disclosure and claims, the term "call" is defined as an interactive communication involving one or more telecommunications terminal users. A call might be a traditional voice telephone call, an instant messaging (IM) session, a video conference, etc.

Figure 1:
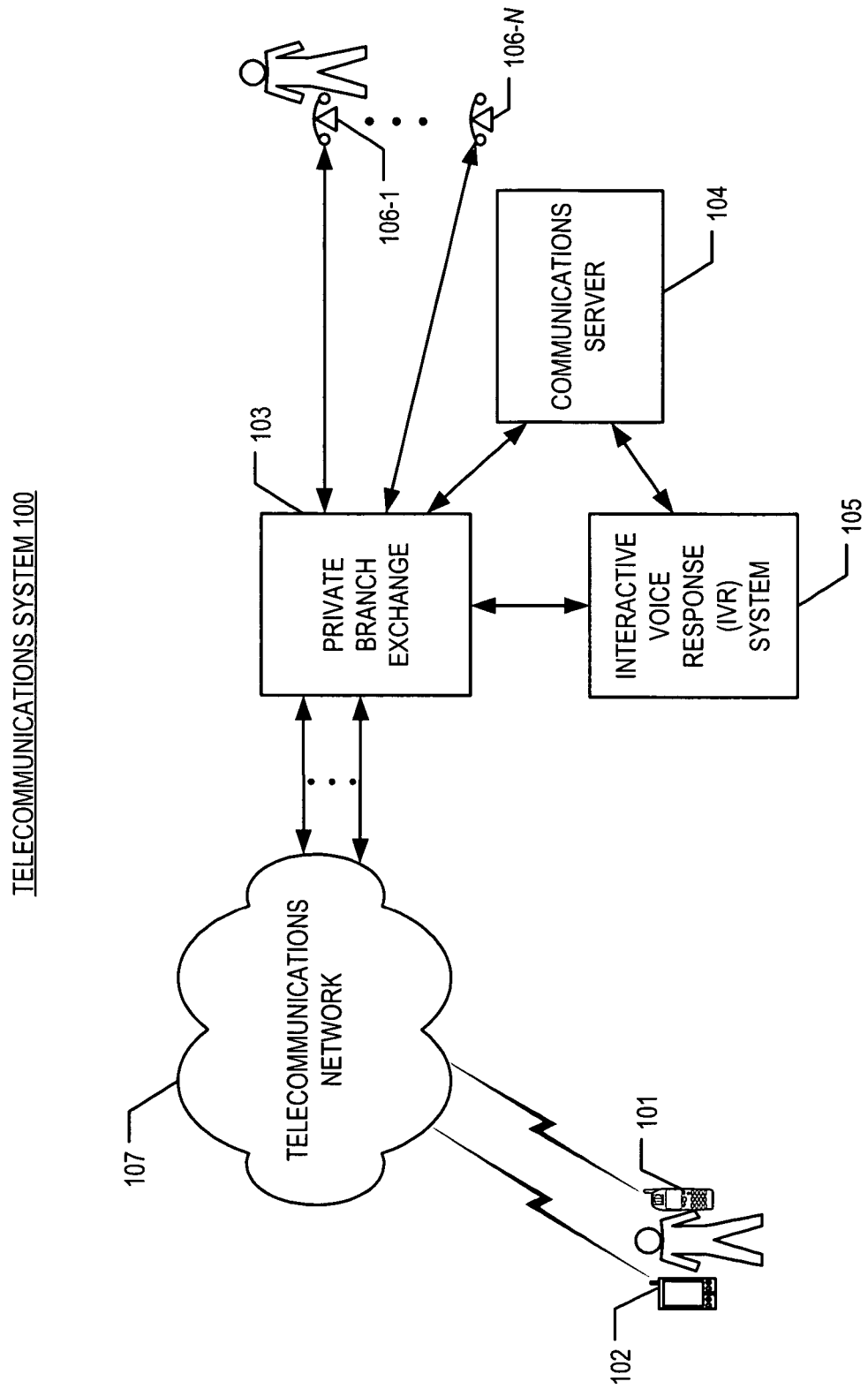
FIG. 1 depicts a portion of a telecommunications system in accordance with the illustrative embodiments of the present invention.

FIG. 1 depicts a portion of telecommunications system 100 in accordance with the illustrative embodiments of the present invention. Telecommunications system 100 comprises telecommunications terminal 101, telecommunications terminal 102, private branch exchange (PBX) 103, communications server 104, interactive voice response (IVR) system 105, telecommunications terminals 106-1 through 106-N, where N is a positive integer, and telecommunications network 107, interconnected as shown.

Private branch exchange (PBX) 103 receives incoming calls from telecommunications network 107 and directs the calls to interactive voice response (IVR) system 105 or to one of telecommunications terminals 106, in well-known fashion. Private branch exchange 103 also receives outbound signals from telecommunications terminals 106 and interactive voice response system 105 and transmits the signals on to telecommunications network 107 for delivery to the appropriate destination terminal, in well-known fashion.

Communications server 104 is a data-processing system that is capable of hosting one or more software applications, of receiving data from and transmitting data to private branch exchange 103, and of receiving data from and transmitting data to interactive voice response (IVR) system 105, in well-known fashion.

Interactive voice response system 105 presents one or more menus to a caller and receives input from the caller (e.g., speech signals, keypad input, etc.) via private branch exchange 103. Interactive voice response system 105 can also submit commands and forward caller input to software applications that resides on communications server 104, and can receive output from such software applications.

Telecommunications terminals 101 and 102 are two different kinds of wireless terminals (e.g., a cell phone and a wireless-capable personal digital assistant, etc.) carried by a user, as shown in FIG. 1.

In the illustrative embodiments of the present invention, private branch exchange (PBX) 103, communications server 104, interactive voice response (IVR) system 105, and telecommunications terminals 106-1 through 106-N belong to an enterprise communications system, while telecommunications terminals 101 and 102 do not belong to the enterprise communications system. It will be clear to those skilled in the art, however, that in some other embodiments of the present invention, a different subset of elements of telecommunications system 100, or none of the elements of telecommunications system 100, might belong to an enterprise communications system.

Figure 2:
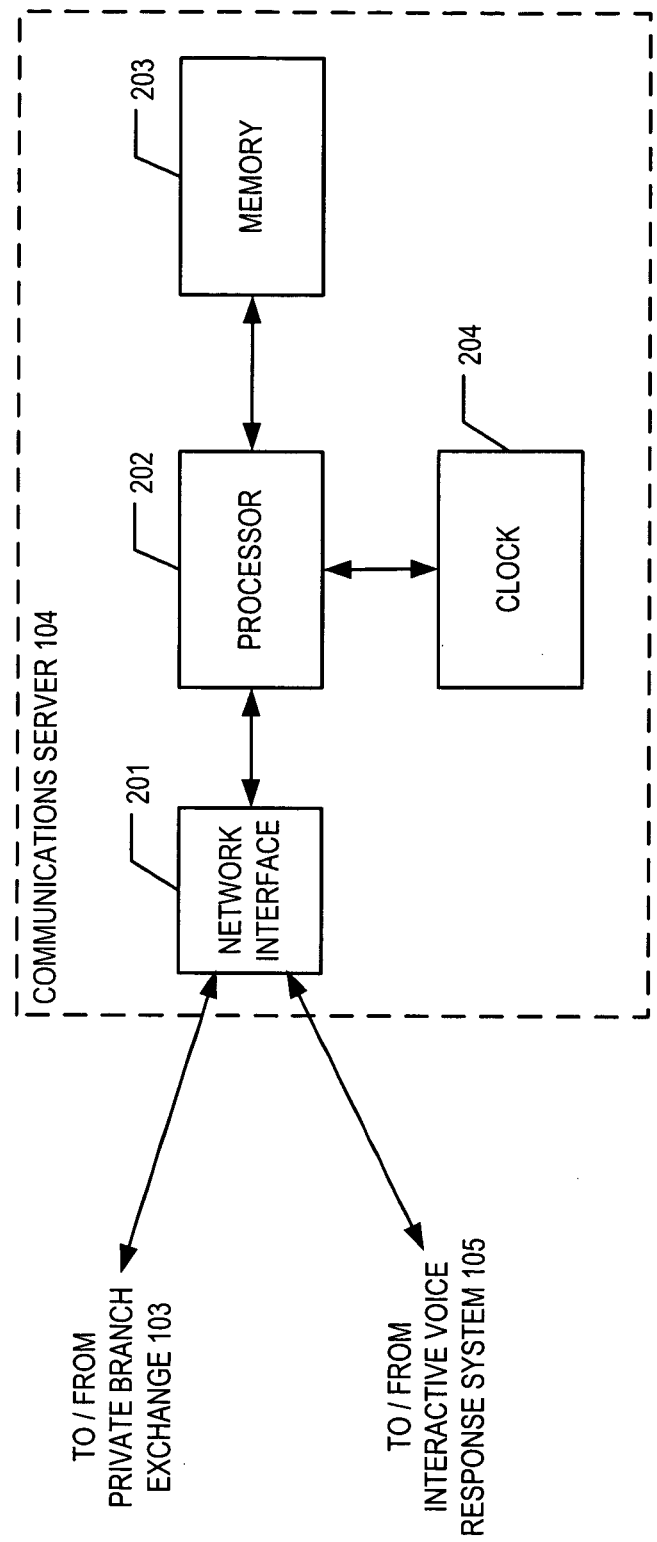
FIG. 2 depicts a block diagram of the salient components of communications server 104, as shown in FIG. 1, in accordance with the illustrative embodiments of the present invention.

FIG. 2 depicts a block diagram of the salient components of communications server 104, in accordance with the illustrative embodiments of the present invention. Communications server 104 comprises network interface 201, processor 202, memory 203, and clock 204, interconnected as shown.

Network interface 201 comprises a receiving part and a transmitting part. The receiving part receives signals from private branch exchange 103 and IVR system 105, and forwards the information encoded in the signals to processor 202, in well-known fashion. The transmitting part receives information from processor 202, and outputs signals that encode this information to private branch exchange 103 and IVR system 105, in well-known fashion. It will be clear to those skilled in the art how to make and use network interface 201.

Processor 202 is a general-purpose processor that is capable of: receiving information from and transmitting information to network interface 201; reading data from and writing data into memory 203; receiving signals from clock 204; and executing the tasks described below and with respect to FIGS. 3 and 4. In some alternative embodiments of the present invention, processor 202 might be a special-purpose processor. In either case, it will be clear to those skilled in the art, after reading this disclosure, how to make and use processor 202.

Memory 203 stores data and executable instructions, as is well-known in the art, and might be any combination of random-access memory (RAM), flash memory, disk drive memory, etc. It will be clear to those skilled in the art, after reading this disclosure, how to make and use memory 203.

Clock 204 transmits the current time, date, and day of the week to processor 202, in well-known fashion.

Figure 3:
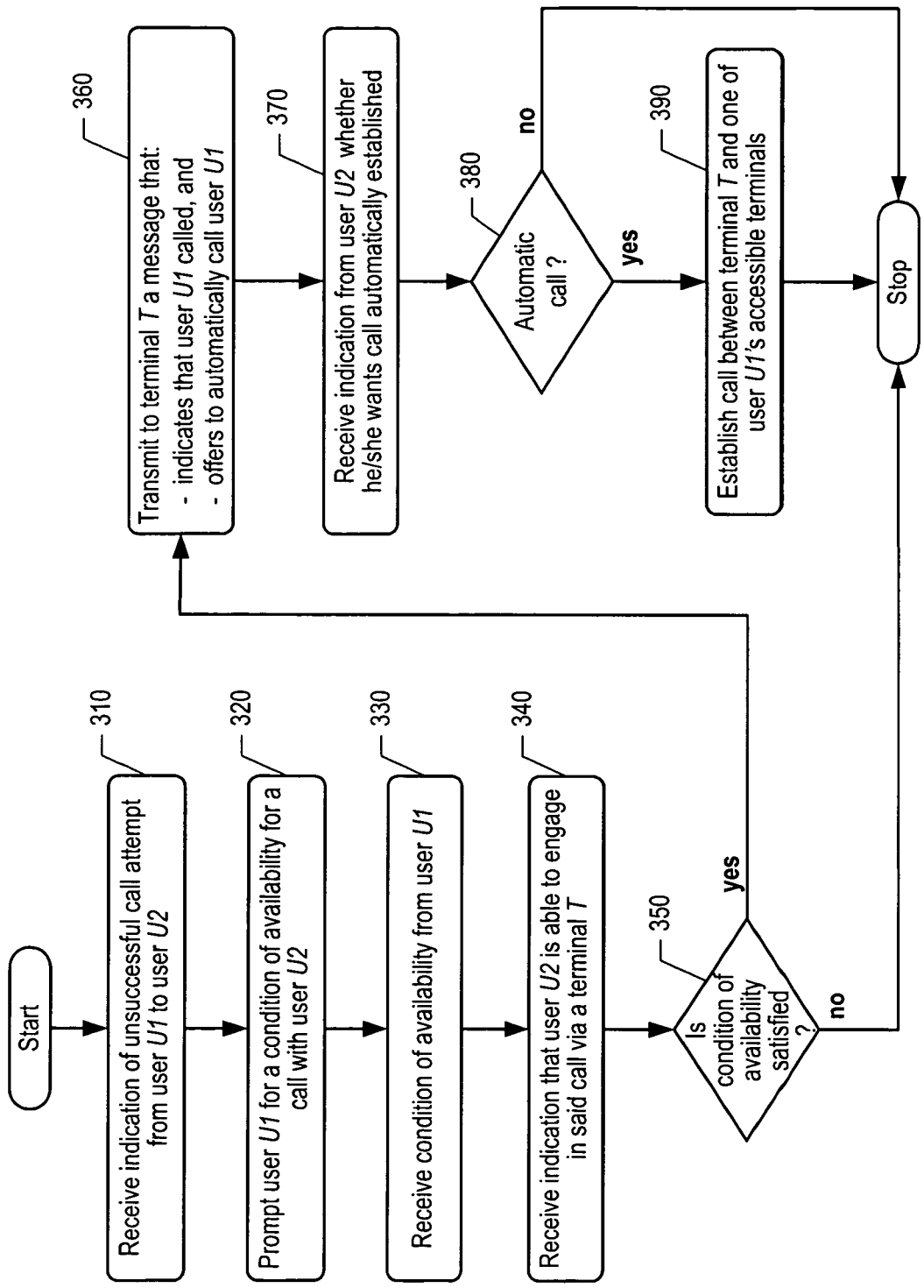
FIG. 3 depicts a flowchart of the operation of communications server 104 when an unsuccessful call attempt occurs, in accordance with the first illustrative embodiment of the present invention.

FIG. 3 depicts a flowchart of the operation of communications server 104 when an unsuccessful call attempt occurs, in accordance with the first illustrative embodiment of the present invention.

At task 310, communications server 104 receives, via private branch exchange 103, an indication of an unsuccessful call attempt from a user $U_1$ to a user $U_2$, in well-known fashion. In the illustrative embodiments of the present invention, if a call originates from outside the enterprise, it is placed via private branch exchange 103 (e.g., by first dialing a phone number of PBX 103 and subsequently entering the phone number to call via IVR system 105, etc.) so that private branch exchange 103, and subsequently communications server 104, receives an indication of whether the call was successful. As described below, some other embodiments of the present invention do not employ private branch exchange 103, in which case an alternative mechanism notifies communications server 104 of unsuccessful calls (e.g., a signal might be sent from a Public Switched Telephone Network (PSTN) switch to communications server 104, etc.)

At task 320, communications server 104 prompts user $U_1$, via interactive voice response (IVR) system 105, for a condition of availability for a return call from user $U_2$, in well-known fashion.

At task 330, communications server 104 receives a condition of availability from user $U_1$, via interactive voice response (IVR) system 105, in well-known fashion. The condition of availability might be defined in terms of any combination of the following: a time constraint, a location constraint, a particular telecommunications terminal of user $U_1$ that must receive the return call, and so forth. A time constraint might be a time interval, as described above, or one or more particular days of the week (e.g., OK to call me on Mondays and Thursdays, etc.), or one or more particular days of the month (e.g., call me anytime except the last day of each month, etc.), or one or more particular days of the year (e.g., call me anytime except December $25^{th}$ and January $1^{st}$, etc.), or some combination thereof.

At task 340, communications server 104 receives an indication that user $U_2$ is able to engage in a call with user $U_1$ via a telecommunications terminal T. As will be appreciated by those skilled in the art, this might occur via a power-on registration signal reported by telecommunications terminal T, a signal that indicates that telecommunications terminal T has just entered an area of cellular coverage, and so forth.

At task 350, communications server 104 checks whether the condition of availability received at task 330 is presently satisfied. As will be appreciated by those skilled in the art, checking whether a location constraint is satisfied requires a mechanism in which server 104 receives continual updates of user $U_1$'s location (e.g., from a Global Positioning System [GPS]-capable terminal carried by user $U_1$, etc.). As will further be appreciated by those skilled in the art, if the condition of availability received at task 330 specifies a particular terminal of user $U_1$, communications server 104 checks whether that terminal is available. If the condition of availability is satisfied, execution continues at task 360; otherwise the method of FIG. 3 terminates.

At task 360, communications server 104 transmits, via interactive voice response (IVR) system 105 and private branch exchange 103, a message to telecommunications terminal T that: (i) indicates that user $U_1$ called, and (ii) offers to automatically call user $U_1$.

At task 370, communications server 104 receives, via interactive voice response (IVR) system 105 and private branch exchange 103, an indication from user $U_2$ whether he or she wants the call automatically established, in well-known fashion.

At task 380, communications server 104 performs a branch statement based on user $U_2$'s response at task 370. If the response was affirmative, execution continues at task 390, otherwise the method of FIG. 3 terminates.

At task 390, communications server 104 establishes a call between telecommunications terminal T and a terminal of user $U_1$ that is accessible. If the condition of availability received at task 330 specified a particular terminal of user $U_1$, then that terminal is the terminal that is called. Otherwise, as will be appreciated by those skilled in the art, communications server 104 can select one of user $U_1$'s available terminals, if there is more than one, based on any of a variety of methods. For example, the terminal with which user $U_1$ placed the unsuccessful call attempt might always be selected if it is available, or there might be a priority ordering of terminals based on terminal type. After task 390 is completed, the method of FIG. 3 terminates.

As will be appreciated by those skilled in the art, in some other embodiments of the present invention tasks 460 through 490 are bypassed (i.e., a call between user $U_1$'s terminal and user $U_2$'s terminal is immediately established, without first offering to do so.) In some other embodiments of the present invention, tasks 470 and 480 are bypassed, and at task 460 a message M' is displayed as the call is established, where message M' indicates some combination of: (i) the identity of user $U_1$, (ii) the time of the unsuccessful call attempt, and (iii) the condition of availability. In still some other embodiments of the present invention, message M' is displayed at task 460 and tasks 470 through 490 are bypassed (i.e., it is up to user $U_2$ to proactively call user $U_1$.)

FIG. 4 depicts a flowchart of the operation of communications server 104 when an unsuccessful call attempt occurs, in accordance with the second illustrative embodiment of the present invention. As described above, the second illustrative embodiment is the same as the first illustrative embodiment except that when a condition of availability is not satisfied, communications server 104 determines whether the condition of availability might possibly be satisfied in the future, and if so, continually checks for the condition of availability to become satisfied.

Tasks 410 through 440 are identical to tasks 310 through 340 of FIG. 3.

At task 450, communications server 104 checks whether the condition of availability received at task 430 is presently satisfied. If so, execution continues at task 460, otherwise execution proceeds to task 455.

At task 455, communications server 104 determines whether the condition of availability might possibly be satisfied in the future. This determination can be performed by checking the time constraints of the condition of availability. If there are no time constraints in the condition of availability, then communications server 104 will conclude that the condition might possibly be satisfied in the future.

If communications server 104 determines that the condition of availability cannot possibly be satisfied in the future, the method of FIG. 4 terminates, otherwise execution continues at task 456.

At task 456, communications server 104 checks whether telecommunications terminal T is still currently available. If so, execution continues back at task 450, otherwise execution loops back for another iteration of task 456.

Tasks 460 through 490 are identical to tasks 360 through 390 of FIG. 3.

As will be appreciated by those skilled in the art, although the illustrative embodiments of the present invention employ both private branch exchange (PBX) 103 and communications server 104, some embodiments employ only private branch exchange 103 with software capable of performing the methods of FIGS. 3 and 4. Similarly, some other embodiments of the present invention employ only communications server 104 (for example, embodiments that are more suitable for a telecommunications service provider than an enterprise).

It is to be understood that the above-described embodiments are merely illustrative of the present invention and that many variations of the above-described embodiments can be devised by those skilled in the art without departing from the scope of the invention. For example, in this Disclosure, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the disclosure to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Disclosure are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising: receiving, at a data-processing system, a first signal that indicates an unsuccessful call attempt from a first telecommunications terminal associated with a first user, the unsuccessful call attempt being addressed directly to a wireless telecommunications terminal associated with a second user, wherein the data-processing system is separate from the wireless telecommunications terminal;
   transmitting, in response to the first signal, a second signal that prompts the first user for a multi-modal condition of availability for a future call with the second user;
   receiving, at the data-processing system, a third signal that indicates that a second telecommunications terminal associated with the second user is available for the future call;
   upon receiving the third signal and while the multi-modal condition of availability is satisfied, transmitting, to the second telecommunications terminal, a fourth signal that (i) indicates that the first user previously called, and (ii) requests, prior to establishing a call between the first telecommunications terminal and the second telecommunications terminal, an indication from the second telecommunications terminal that the call be established; and
   in response to receiving, from the second telecommunications terminal, a fifth signal that comprises the indication, establishing the call between the first telecommunications terminal and the second telecommunications terminal.

2. The method of claim 1, wherein the multi-modal condition of availability comprises a time constraint.

3. The method of claim 1, wherein the multi-modal condition of availability comprises a location constraint for the first user based on global positioning system information.

4. The method of claim 2, wherein the time constraint comprises a time interval.

5. The method of claim 1, wherein the fourth signal is part of a message transmitted via an interactive voice response system.

6. The method of claim 1, wherein the multi-modal condition of availability comprises a requirement that a particular telecommunications terminal associated with the first user be available.

7. A method comprising: receiving, at a data-processing system, a first signal that indicates an unsuccessful call attempt from a first telecommunications terminal associated with a first user, the unsuccessful call attempt being addressed directly to a wireless telecommunications terminal associated with a second user, wherein the data-processing system is separate from the wireless telecommunications terminal;
   transmitting, in response to the first signal, a second signal that prompts the first user for a multi-modal condition of availability of the first user for a call with the second user;
   receiving, at the data-processing system, the multi-modal condition of availability in response to the unsuccessful call attempt;
   receiving, at the data-processing system, a third signal that indicates that the second user is able to engage in the call via a second telecommunications terminal, wherein the third signal is in response to prompting the second user, prior to establishing the call between the first telecommunications terminal and the second telecommunications terminal, whether to establish the call;
   upon receiving the third signal and while the multi-modal condition of availability is satisfied, transmitting, to the second telecommunications terminal, a fourth signal that indicates that the first user previously called; and
   in response to receiving a fifth signal that comprises an indication from the second telecommunications terminal to establish the call, establishing the call between the first telecommunications terminal and the second telecommunications terminal.

8. The method of claim 7, wherein the second telecommunications terminal is the wireless telecommunications terminal.

9. The method of claim 7, wherein the multi-modal condition of availability comprises a time constraint.

10. The method of claim 9, wherein the time constraint excludes a time interval.

11. The method of claim 7, wherein the multi-modal condition of availability comprises a requirement that a particular telecommunications terminal associated with the first user be available.

12. A method comprising: receiving, at a data-processing system, a first signal that indicates an unsuccessful call attempt from a first telecommunications terminal associated with a first user, the unsuccessful call attempt being addressed directly to a wireless telecommunications terminal associated with a second user, wherein the data-processing system is separate from the wireless telecommunications terminal;
   transmitting, in response to the first signal, a second signal that prompts the first user for a multi-modal condition of availability for a call with the second user;
   receiving, by the data-processing system, a third signal that indicates that the second user is able to engage in the call via a second telecommunications terminal that is different from the wireless telecommunications terminal, wherein the third signal is in response to prompting the second user for an indication of whether to establish the call with the first telecommunications terminal;
   upon receiving the third signal and while the multi-modal condition of availability is satisfied, transmitting, to the second telecommunications terminal, a fourth signal that indicates that the first user previously called; and
   in response to receiving, from the second telecommunications terminal, a fifth signal that comprises the indication, establishing the call between the first telecommunications terminal and the second telecommunications terminal.

13. The method of claim 12, wherein the multi-modal condition of availability comprises a time constraint.

14. The method of claim 12, wherein the multi-modal condition of availability comprises a location constraint for the first user.

15. The method of claim 12, wherein the second user is prompted whether to establish the call, with a message transmitted via an interactive voice response system.

\* \* \* \* \*